Feb. 9, 1965    J. CHASS    3,168,830
PRESSURE TRANSDUCER
Filed March 25, 1963
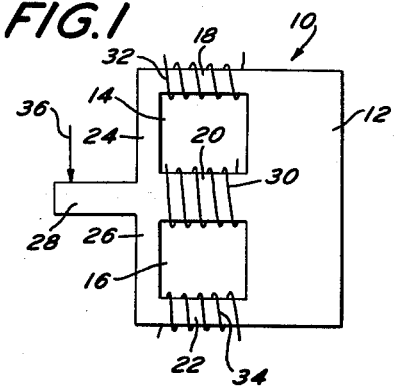
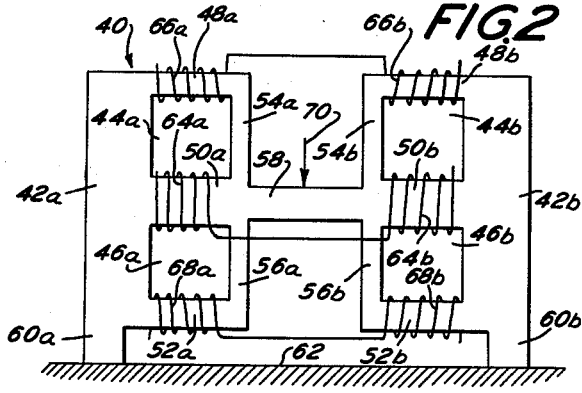
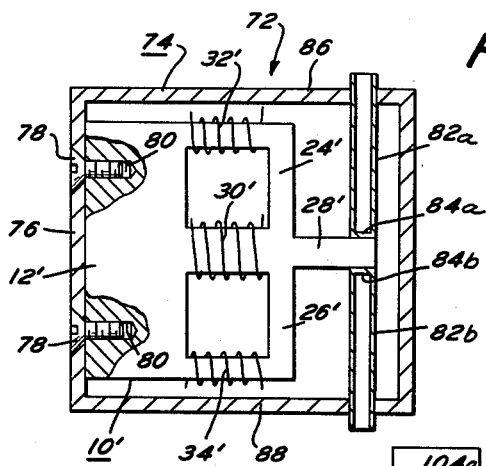
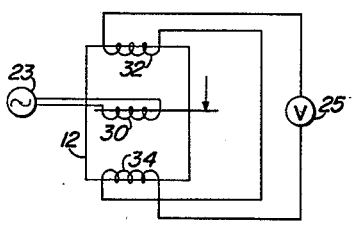
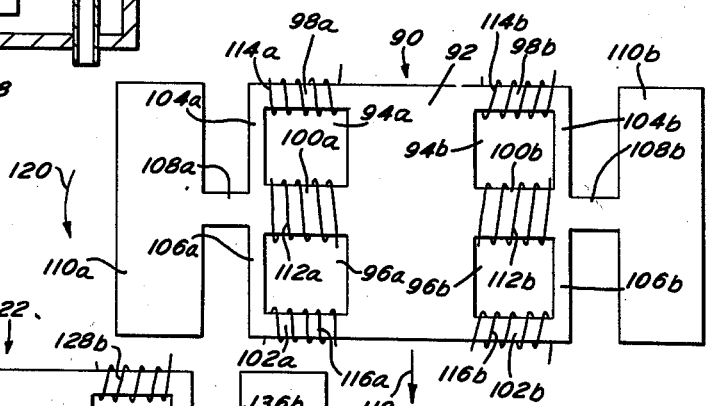
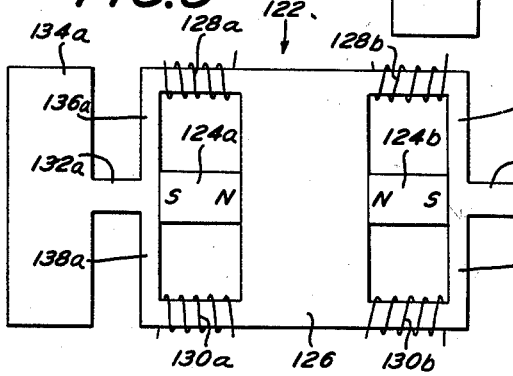
INVENTOR.
JACOB CHASS
BY
*Donald S. Cohen*
ATTORNEY United States Patent Office 3,168,830
Patented Feb. 9, 1965

3,168,830
PRESSURE TRANSDUCER
Jacob Chass, Philadelphia, Pa., assignor to International Resistance Company, Philadelphia, Pa.
Filed Mar. 25, 1963, Ser. No. 267,423
5 Claims. (Cl. 73—398)

The present invention relates to a transducer, and more particularly to a transducer for converting a physical force to an electrical signal for the purpose of measuring the physical force.

For ease of measuring various types of forces, it is often desirable to convert the force to an electrical signal. The forces being measured can be those created by the pressure of a weight, the pressure or difference in pressures of a fluid or gas, or the forces created by acceleration. It is desirable that the device for converting the force to an electrical signal be small and compact, but be capable of measuring a relatively large range of forces. Also, the device should have no moving parts which can become worn or broken so that the device will have a long usable life. In addition, the device should be relatively simple in construction so as to be inexpensive to manufacture.

It is an object of the present invention to provide a novel transducer for converting a physical force to an electrical signal.

It is another object of the present invention to provide a novel force transducer.

It is still another object of the present invention to provide a novel transducer for use in measuring pressures or pressure differentials.

It is a further object of the present invention to provide a novel accelerometer.

It is a still further object of the present invention to provide a novel jerkmeter.

It is another object of the present invention to provide a transducer which is small and compact, which has no moving parts, and which is relatively simple in construction.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a side elevational view of the transducer of the present invention.

FIGURE 2 is a side elevational view of a modification of the transducer of the present invention.

FIGURE 3 is a sectional view, partially in elevation, of another modification of the transducer of the present invention for use in measuring pressure or pressure differentials.

FIGURE 4 is a side elevational view of the transducer of the present invention in the form of an accelerometer.

FIGURE 5 is a side elevational view of the transducer of the present invention in the form of a jerkmeter.

FIGURE 6 is a diagram of a circuit in which the transducer of the present invention is used.

Referring initially to FIGURE 1, the transducer of the present invention is generally designated as 10.

Transducer 10 comprises a substantially rectangular plate 12 of a magnetic material the permeability of which will vary when the material is stressed, such as the permalloys. Plate 12 has a pair of substantially rectangular openings 14 and 16 therethrough adjacent one side edge of the plate. The openings 14 and 16 provide three parallel arms 18, 20, and 22, which are perpendicular to the side edge of the plate 12. The center arm 20 is connected to the outer arms 18 and 22 by a pair of relatively thin legs 24 and 26 which are in alignment along the side edge of the plate 12. A moment arm 28 projects from the side edge of the plate 12 in alignment with the center arm 20, and perpendicular to the legs 24 and 26. A primary winding 30 of insulated, electrically conductive wire is helically wound around the center arm 20. A pair of secondary windings 32 and 34 of insulated, electrically conductive wire are helically wound around the outer arms 18 and 22 respectively.

In the use of the transducer 10 of the present invention, the primary winding 30 is connected to a source 23 of A.C. current. The current in the primary winding 30 creates two separate magnetic flux paths. One of the magnetic flux paths passes through the center arm 20, the leg 24, outer arm 18, and the plate 12. The other magnetic flux path passes through the center arm 20, leg 26, outer arm 22, and plate 12. These magnetic flux paths induce voltages of equal magnitude in the secondary windings 32 and 34. However, since the magnetic flux paths flow in opposite directions, the voltages induced across the secondary windings 32 and 34 are of opposite polarity.

When a force is applied to the moment arm 28, such as indicated by the arrow 36, the force will stress the legs 24 and 26. Leg 24 will be stressed in tension, and leg 26 will be stressed in compression. Since the plate 12 is of a material the permeability of which varies when the material is stressed, the stressing of the legs 24 and 26 by the force applied to the moment arm 28 will vary the permeability of the legs 24 and 26, and thereby vary the voltages induced across the secondary windings 32 and 34. It is well known that stressing such materials in tension varies the permeability of the material differently than when the material is stressed in compression. For example, when the material is stressed in tension, the permeability of the material may decrease, whereas when the material is stressed in compression, the permeability of the material may increase. Since the leg 24 is stressed in tension by the force applied to the moment arm 28, the permeability of the leg 24 will decrease so as to decrease the voltage induced across the secondary winding 32. However, since the leg 26 is stressed in compression, the permeability of the leg 26 will increase so as to increase the voltage induced across the secondary winding 34. By measuring the difference between the voltages induced across the secondary windings 32 and 34, there is provided an indication of the force applied to the moment arm 28. Since the voltages induced across the secondary windings 32 and 34 are of opposite polarity, by connecting the secondary windings in series, as shown in FIGURE 6, the voltage across the two secondary windings, as indicated by voltmeter 25, will be the difference between the voltages induced across the secondary windings. Also, the phase of the voltage across the two secondary windings connected in series will indicate the direction of the force applied to the moment arm 28. Thus, by pre-calibrating the transducer 10 of the present invention, the electrical output from the secondary windings 32 and 34 of the transducer can be read as the force being measured.

Referring to FIGURE 2, a modification of the transducer of the present invention is generally designated as 40. Transducer 40 comprises a pair of substantially rectangular plates 42a and 42b of a magnetic material, the permeability of which varies when the material is stressed, such as the permalloys. Plate 42a is provided with a pair of substantially rectangular openings 44a and 46a therethrough adjacent a side edge thereof, and plate 42b is provided with a similar pair of rectangular openings 44b and 46b therethrough adjacent a side edge thereof. The openings 44a and 46a in the plate 42a form three parallel arms 48a, 50a, and 52a which are perpendicular to one side of the plate, and which are connected along the one side of the plate by a pair of aligned legs 54a and 56a. The openings 44b and 46b in the plate 42b form three parallel arms 48b, 50b and 52b which are perpendicular to one side of the plate 42b, and which are connected along the one side of the plate by a pair of aligned legs 54b and 56b. The plates 42a and 42b are mounted with their side edges formed by the legs 54a, 56a, and 54b, 56b being adjacent but spaced from each other. The plates 42a and 42b are connected together by a moment arm 58 connected to the adjacent side edges of the plates in alignment with the center arms 50a and 50b. As shown, the plates 42a and 42b are provided with supporting legs 60a and 60b for supporting the transducer 40 on a base 62.

A primary winding 64a is helically wound around the center arm 50a of the plate 42a. A similar primary winding 64b is helically wound around the center arm 50b of the plate 42b. The primary windings 64a and 64b are electrically connected in series. A pair of secondary windings 66a and 68a are helically wound around the outer arms 48a and 52a respectively of the plate 42a. A similar pair of secondary windings 66b and 68b are helically wound around the outer arms 48b and 52b respectively of the plate 42b. The secondary windings 66a and 66b are electrically connected in series, and the secondary windings 68a and 68b are electrically connected in series.

In the use of the transducer 40 of the present invention, the primary windings 64a and 64b are connected to a source of A.C. current. As previously stated with regard to the transducer 10 of FIGURE 1, the current in the primary windings 64a and 64b creates a pair of magnetic flux paths in each of the plates 42a and 42b which pass through the secondary windings 66a, 68a, 66b, and 68b. Thus there is induced across each of the secondary windings voltages of equal magnitude, but with the voltages induced across the secondary windings 66a and 66b, being of opposite polarity to the voltages induced across the secondary windings 66a and 66b.

When a force is applied to the moment arm 58, such as indicated by the arrow 70, the legs 54a and 54b of the plates 42a and 42b will be stressed in tension and the legs 56a and 56b will be stressed in compression. Stressing the legs 54a, 54b, 56a and 56b varies the permeability of the legs so as to vary the voltages induced across the secondary windings. However, as previously stated, the permeability of the legs 54a and 54b, which are stressed in tension will vary in the opposite direction from the permeability of the legs 56a and 56b, which are stressed in compression. Thus, voltage induced across one set of the secondary windings 66a, 66b, and 68a, 68b will increase whereas the voltage induced across the other set of the secondary windings will decrease. The difference between the voltages induced across the two sets of the secondary windings provides an indication of the force being measured.

Although the transducer 40 of FIGURE 2 operates in substantially the same manner as the transducer 10 of FIGURE 1, transducer 40 has the advantage that it can measure larger forces while still maintaining the legs 54a, 54b, 56a and 56b of the plates 42a and 42b relatively thin. It is desirable to maintain the legs of the plates as thin as possible to obtain greater accuracy in the reading of the force being measured. Also, with the transducer 40, the point along the moment arm 58 at which the force is applied is not critical since the corresponding secondary windings of the plates are electrically connected in series and are aiding each other.

Referring to FIGURE 3, a pressure transducer for measuring the pressures or differences in pressures of a liquid or gas using the transducer of the present invention is generally designated as 72. Pressure transducer 72 comprises an enclosed casing 74. Within the casing 74 is mounted a transducer 10' similar to the transducer 10 of FIGURE 1. As shown, the plate 12' of the transducer 10' is secured to a side wall 76 of the casing 74 by screws 78 extending through the side wall 76 and threaded into holes 80 in the side edge of the plate 12' opposite the moment arm 28'. A cylindrical tube 82a having one closed end 84a extends into the casing 74 through the top wall 86 of the casing, and has its closed end 84a seated against the moment arm 28' of the transducer 10'. A second cylindrical tube 82b having a closed end 84b extends into the casing 74 through the bottom wall 88 of the casing, and has its closed end 84b seated against the moment arm 28' of the transducer 10'. The tubes 82a and 82b are of the same size, and are in alignment on opposite sides of the moment arm 28' of the transducer 10'.

In the use of the pressure transducer 72, the primary winding 30' of the transducer 10' is connected to a source of A.C. current so that voltages of equal magnitude but of opposite polarity are induced in the secondary windings 32' and 34' of the transducer 10'. To measure the pressure of a liquid or gas, one of the tubes, such as the tube 82a is connected to the source of pressure, while the other tube 82b may be left open to the atmosphere. Thus, the pressure being measured is applied to the moment arm 28' of the transducer 10' through the closed end 84a of the tube 82a. If the pressure being measured is greater than atmospheric pressure, a downward force is applied to the moment arm 28' so as to stress the leg 24' of the transducer 10' in tension, and stress the leg 26' in compression. As previously described with regard to the transducer 10 of FIGURE 1, this varies the voltages induced across the secondary windings 32' and 34', and the difference between the voltages indicates the pressure being measured. If the pressure being measured is less than atmospheric pressure, an upward force is applied to the moment arm 28' so as to stress the legs 24' and 26' of the transducer 10', and thereby vary the voltages induced across the secondary windings 32' and 34'. The polarity of the difference in voltages of the secondary windings 32' and 34' will indicate whether the pressure being measured is greater or less than atmospheric pressure.

To measure the difference between two sources of pressure, each of the tubes 82a and 82b is connected to a separate one of the sources of pressure. If the pressures being measured are of equal magnitude, no force will be applied to the moment arm 28' of the transducer 10' so that the difference between the voltages induced across the secondary windings 32' and 34' will be zero. If one of the sources of pressure is of greater magnitude than the other, a force will be applied to the moment arm 28' which will stress the legs 24' and 26' of the transducer 10'. This will create a difference in the voltages induced across the secondary windings 32' and 34' which will indicate the difference in the pressures being measured.

If it is desired to use the pressure transducer 72 to control a constant difference between two sources of pressure, one of the tubes can be made of larger diameter than the other tube, or one of the tubes can be positioned at a different point along the moment arm 28' than the other tube. The tube which is of smaller diameter or which is positioned closer to the plate 12' is connected to the higher pressure source, and the other tube is connected to the lower pressure source. The difference in the diameters of the tubes or the difference in the position of the tubes along the moment arm will provide forces of equal magnitude on opposite sides of the moment arm even though the pressures within the tubes are of different magnitude. Thus, when the pressures within the tubes are of desired difference, the voltages induced across the secondary windings 32' and 34' will be of equal magnitude so that the difference between the induced voltages will be zero. However, if there is a variation in the difference between the pressures within the tubes, a force will be applied to the moment arm 28' so as to vary the voltages across the secondary windings 32' and 34'. By connecting the secondary windings 32' and 34′ in series, the voltage output from the secondary windings will be the difference between the voltages induced across the individual secondary windings. This voltage output can be connected through suitable instrumentation to a means for controlling the pressures being measured. Thus, the pressure transducer 72 can be used to maintain a constant pressure difference between two sources of pressure.

Referring to FIGURE 4, an accelerometer using the transducer of the present invention is generally designated as 90. Accelerometer 90 comprises a rectangular plate 92 of a magnetic material the permeability of which varies when the material is stressed. Plate 92 is provided along one side edge thereof, with a pair of rectangular openings 94a and 96a, and along the other side edge thereof with a second pair of rectangular openings 94b and 96b. The openings 94a and 96a in the plate 92 form three parallel arms 98a, 100a and 102a connected together along the adjacent side edge of the plate 92 by two aligned legs 104a and 106a. The openings 94b and 96b in the plate 92 form three parallel arms 98b, 100b and 102b connected together along the adjacent side edge of the plate by a pair of aligned legs 104b and 106b. A pair of moment arms 108a and 108b project from the side edges of the plate 92 in alignment with the center arms 100a and 100b respectively. Separate weights 110a and 110b of the same size are secured to the ends of the moment arms 108a and 108b respectively. Separate primary windings 112a and 112b are helically wound around the center arms 100a and 100b respectively. Separate secondary windings 114a and 116a are helically wound around the arms 98a and 102a respectively, and separate secondary windings 114b and 116b are helically wound around the arms 98b and 102b respectively.

In the use of the accelerometer 90, the primary windings 112a and 112b are connected to a source of A.C. current. The current in each of the primary windings produces a pair of magnetic flux paths so as to induce voltages of like magnitude across each of the secondary windings 114a, 116a, 114b, and 116b. However, the phase of the voltages induced across the secondary windings 114a and 114b are opposite to the phase of the voltages induced across the secondary windings 116a and 116b respectively. When the accelerometer 90 is accelerated linearly, for example in the direction of the arrow 118, the weights 110a and 110b will apply a force on the moment arms 108a and 108b. The force applied to the moment arms will stress the legs 104a and 104b in compression, and will stress the legs 106a and 106b in tension. This stressing of the legs 104a, 106a, 104b and 106b varies the voltages induced across the secondary windings 114a, 116a, 114b and 116b with the voltages induced across the secondary windings 114a and 114b being of a different magnitude than the voltages induced across the secondary windings 116a and 116b. The difference between the voltages induced across the secondary windings provides an indication of the acceleration of the accelerometer 90.

If the accelerometer 90 is rotated, for example in the direction of the arrow 120, any acceleration of the accelerometer 90 will cause the weights 110a and 110b to apply a force on the moment arms 108a and 108b respectively. This force applied to the moment arms 108a and 108b will stress the legs 104a and 106b in compression, and stress the legs 106a and 104b in tension. This in turn will vary the voltages induced across the secondary windings with the magnitude of the voltages induced across the secondary windings 114a and 116b being different from the magnitude of the voltages induced across the secondary windings 116a and 114b. The difference between the voltages induced across the secondary windings provides an indication of the amount of acceleration. By properly connecting the secondary windings, any linear acceleration response can be cancelled so that only rotary acceleration will be indicated. This can be achieved by connected secondary windings 116a and 114b in series aiding relation, and secondary windings 114a and 116b in series aiding relation. Secondary windings 116a and 114b are then connected in bucking relation with secondary windings 114a and 116b. By series aiding relation it is meant that the secondary windings are connected in accordance with their polarity so that the voltages induced across the windings add together. By bucking relation it is meant that the secondary windings are connected in accordance with their polarity so that the voltages induced across the windings subtract from each other.

Thus, the accelerometer 90 is of the present invention can be used to measure either linear or rotational acceleration. Although the accelerometer 90 is shown as having two sets of windings, one at each side edge thereof, for measuring linear acceleration, only one set of the windings is necessary.

Referring to FIGURE 5, a jerkmeter utilizing the transducer of the present invention is generally designated as 122. A jerkmeter is a device for measuring the rate of change of acceleration.

Jerkmeter 122 is similar in construction to the accelerometer 90 of FIGURE 4 except that instead of using a source of A.C. current to create the magnetic flux paths, there is provided a source of a magnetic flux, the time derivative of which equals zero. By this it is meant that the source provides a magnetic flux the magnitude of which does not vary with time. As shown, one such source of the magnetic flux are a pair of permanent magnets 124a and 124b. The magnet 124a is mounted on the plate 126 parallel to and intermediate the secondary windings 128a and 130a. The magnet 124b is mounted on the plate 126 parallel to and intermediate the secondary windings 128b and 130b. Moment arms 132a and 132b extend from the side edges of the plate 126 in alignment with the magnets 124a and 124b, and weights 134a and 134b are mounted on the ends of the moment arms 132a and 132b respectively.

In the operation of the jerkmeter 122, each of the magnets 124a and 124b creates a pair of magnetic flux paths which extend through the secondary windings 128a, 130a and 128b, 130b. Thus, voltages of equal magnitude are induced across the secondary windings with the polarity of the voltages induced across the secondary windings 128a and 128b being opposite to the polarity of the voltages induced across the secondary windings 130a and 130b. When the jerkmeter 122 is moved linearly or is rotated, acceleration of the jerkmeter will cause the weights 134a and 134b to apply a force on the moment arms 132a and 132b respectively. The force applied to the moment arms 132a and 132b will stress the legs 136a, 138a and 136b, 138b of the plate 126 to vary the permeability of the legs. As was previously described with regard to the operation of the accelerometer 90 of FIGURE 4, the legs of the plate 126 will be stressed either in tension or compression depending on the type of movement of the jerkmeter 122. Stressing the legs of the plate 126 will vary the voltages induced across the secondary windings.

The voltage induced across each of the secondary windings is a function of $dI/dt$ where I is the permeability of the leg adjacent each of the secondary windings. Since the permeability is only varied by means of a force applied to the leg so as to stress the leg, the voltage induced across each of the secondary windings is a function of $dF/dt$, where F is a force applied to the moment arms upon accelerating the jerkmeter. Since the force equals mass times acceleration, and since the mass, the weights 134a and 134b, is constant, the voltage induced across each of the secondary windings is a function of $da/dt$ where $a$ is acceleration. Thus, the voltage output from the jerkmeter 122 of the present invention is a function of the rate of change of acceleration of the jerkmeter. The voltage output from the jerkmeter 122 is the difference between the voltages induced across the secondary windings. Thus, the jerkmeter 122 of the present invention will measure the rate of change of acceleration in the same manner that the accelerometer 90 of FIGURE 4 will measure acceleration.

Thus, there is provided by the present invention a transducer which can measure forces created in various manners. The transducer of the present invention can be used to measure direct physical forces applied thereto, the pressure or pressure differential of liquids or gases, acceleration, or the rate of change of acceleration. A large range of forces can be accurately measured by the transducer of the present invention by varying the length of the moment arm or moment arms of the transducer. Since the transducer of the present invention has no moving parts, it has a long usable life. In addition, the transducer of the present invention is relatively small and compact, and simple in construction so as to be inexpensive to manufacture.

The present invention may be embodied in other specific forms without departing from the spirit or essential attributes thereof and, accordingly, reference should be made to the appended claims, rather than to the foregoing specification as indicating the scope of the invention.

I claim:

1. A transducer comprising a substantially rectangular plate of a magnet material the permeability of which varies when the material is stressed, said plate having a pair of spaced openings therethrough adjacent one side edge of the plate, said openings forming three spaced parallel arms which are perpendicular to the one side edge of the plate and a pair of aligned legs extending along said one side edge of the plate and connecting the center arm to the outer arms, a moment arm projecting from said one side edge of the plate in alignment with the center arm, a separate secondary winding wound around each of the outer arms, and means for creating a pair of magnetic flux paths each of which extends through a separate one of said secondary windings to induce a voltage thereacross.

2. A transducer in accordance with claim 1 in which the means for creating the magnetic flux paths comprises a primary winding wound on the plate.

3. A transducer in accordance with claim 2 in which the primary winding is wound around the center arm.

4. A transducer comprising a pair of substantially rectangular plates of a magnetic material the permeability of which varies when the material is stressed, each of said plates having a pair of spaced openings therethrough adjacent one side edge of the plates, each of said pair of openings providing each plate with three spaced parallel arms which are perpendicular to the one side edge of the plate and a pair of aligned legs extending along said one side edge and connecting the center arm to the outer arms, a moment arm extending between and connected to the one side edge of said plates, said moment arm being in alignment with the center arms of said plates, a separate secondary winding wound around each of the outer arms of each of said plates and a separate primary winding wound around the center arm of each of said plates.

5. A pressure transducer comprising a casing, a substantially rectangular plate within said casing and secured at one side edge to a wall of the casing, said plate being of a magnetic material the permeability of which varies when the material is stressed, said plate having a pair of spaced openings therethrough adjacent the other side edge thereof, said openings forming three spaced parallel arms which are perpendicular to said other side edge of the plate and a pair of aligned legs extending along said other side edge of the other side edge and connecting the center arm to the outer arms, a moment arm projecting from the other side edge of the plate in alignment with the center arm, a pair of tubes, extending into the casing, each of said tubes having a closed end within the casing and an open end outside of the casing, the closed ends of said tubes engaging opposite sides of the moment arm, a separate secondary winding wound around each of the outer arms of the plate, and a primary winding wound around the center arms of the plate.

References Cited in the file of this patent

UNITED STATES PATENTS

| | | |
|---|---|---|
| 2,317,166 | Abrams | Apr. 20, 1943 |
| 2,370,845 | Davis | Mar. 6, 1945 |
| 2,460,076 | Emerson | Jan. 25, 1949 |
| 2,749,746 | Wright | June 12, 1956 |
| 2,842,689 | Harris | July 8, 1958 |
| 3,007,063 | Harris | Oct. 31, 1961 |
| 3,122,927 | Chass | Mar. 3, 1964 |

FOREIGN PATENTS

| | | |
|---|---|---|
| 442,441 | Great Britain | Feb. 3, 1936 |